United States Patent Office 3,537,861
Patented Nov. 3, 1970

3,537,861
PROCESS FOR DYEING POPCORN
Bernard J. Schwarzkopf, Lake View, Iowa, assignor, by mesne assignments, to National Oats Company, Inc., a corporation of Delaware
No Drawing. Filed Feb. 15, 1968, Ser. No. 705,605
Int. Cl. A23l 1/10
U.S. Cl. 99—83
3 Claims

ABSTRACT OF THE DISCLOSURE

Unpopped popcorn is dyed in edible or non-toxic liquid dyes and in various colors at a temperature promoting uniform application of dye to the kernels and the kernels drained, surface dried, and then subjected to countercurrent heated air drying to remove dye and moisture for improving the quality of the dyed product.

BACKGROUND AND SUMMARY

For many years unpopped popcorn has been dyed in variegated colors using an aqueous bath of a vegetable or coal tar dye of food value usually together with a grease-cutting agent. U.S. Pat. No. 2,663,645 describes such a process in which the dye solution is heated to a boiling temperature and the kernels submerged in the heated solution for a short period and thereafter the kernels are washed or rinsed in hot water to remove the free dye and the kernels are allowed to drain. After draining, the kernels are dried in a mechanical dryer to reduce the moisture to about 10–15 percent and then the kernels are allowed to sit or age for a period of several days to several weeks in order to bring about a uniform distribution of the moisture in the kernel.

One difficulty with the foregoing type of process is the long time of aging making it necessary to provide extensive storage facilities while limiting the amount of production. Further, in the dyeing operation the kernels were subjected to a boiling dye solution which is severe treatment particularly when followed by an extensive aging period.

I have discovered that it is possible to secure uniform application of the dye to the kernel during the dyeing process and later, after surface drying in a mechanical dryer, to complete the processing in short order by subjecting the kernels to a continuous countercurrent contact with heated air for bringing the moisture content to the desired level of about 14 percent. Not only is the long aging period thus eliminated but also a product of better quality is obtained. The heated air is applied in large volume in countercurrent flow to the corn which is constantly recycled and it is found that this operation results in the rapid drying of the kernel interior while also bringing about the desired uniform moisture content of the kernel.

DETAILED DESCRIPTION

In one embodiment of the invention, dye solutions are prepared in vats as, for example, one solution being that of a yellow dye, another of a red dye, another of a blue dye, and another of a green dye. The dyes are the usual certified primary food color dyes and are usually of vegetable or coal tar dye origin, etc. The dyes may be mixed with water and with grease-cutting agents such as detergents (sodium lauryl sulfate, etc.). The dye solutions are heated to about 160–170° F. and the corn is immersed in the vats usually for a period of about five minutes. Such immersion and this temperature range are found to give a uniform application of the dye to the kernels so that later, heated air in large volume can be successfully applied for drying the kernels.

The kernels, after being removed from the dye solution, are washed or rinsed with water until no free dye remains on the kernel. The kernels are then allowed to drain and are passed through a mechanical dryer at a temperature of about 77–82° F. The moisture of the popcorn as it comes off the mechanical dryer is about 22–24 percent. The dryer is the usual type of dryer in which the corn passes on belts through a chamber through which a heated air medium is passed, the temperature of the medium being about 77–82° F. The temperature of the popcorn as it leaves the dryer is about 65–75° F.

From the dryer, a batch of popcorn which, by way of example, may be referred to as red-dyed popcorn, is passed into a tower having an inclined perforated plate bottom and heated air is passed by a blower through the perforated bottom upwardly through the corn in the tower. At the same time, corn is withdrawn from the inclined bottom of the tower and passed upwardly into the top of the tower so that there is a countercurrent flow of the corn with respect to the upwardly-moving volume of heated air. I prefer to heat the air to at least 80–90° F. and the volume of the heated air is large as, for example, about 6,000 cubic feet per minute at one inch static pressure.

The popcorn may be dyed in successive batches in the various colors desired and each batch may be separately surface-dried and then subjected to countercurrent heating for the removal of interior moisture. Subsequently the kernels may be segregated in storage bins according to their colors, and finally the kernels may be withdrawn from the storage bins and mixed and packaged as desired.

Specific examples illustrative of the process may be set out as follows:

EXAMPLE I

Cleaned and graded popcorn having a moisture content in the range of 13–14.5 percent was dyed in wire containers using four dye mixing and storage vats. The colors were certified primary food colors. In one vat the color was yellow, and in the other vats the colors were red, blue, and green, respectively. Corn was filled into a wire container and the basket immersed in one of the vats. The corn was then rinsed to remove the surface dye and then dumped on a vibrating washer screen. From the screen the corn was passed through a dryer at a temperature of 77–82° F., leaving the dryer with a moisture content of 22–24 percent. The temperature of the corn leaving the dryer was about 70° F. The same procedure was followed for dyeing corn in each of the four vats.

From the dryer, each batch of corn according to its color was passed into a tower employed for that color, and the tower had a perforated bottom which was inclined and through which heated air having a temperature of about 90° F. was passed in a volume of about 6,000 cubic feet per minute at one inch static pressure. The corn was withdrawn at the bottom of each tower above the perforated bottom and recycled to the top so as to keep a continuous countercurrent flow of the corn relative to the upward flow of the heated air. After about 22 hours, it was found that the interior of the corn kernel was dry, not only with respect to liquid dye but also with respect to the moisture, the moisture of the kernel being now about the same as that of the incoming corn, namely, 13–14.5 percent. I prefer a moisture content of about 14 percent.

The corn from the four coloring vats was each processed separately in towers and the dried corn from each tower was passed to separate storage towers. It was found that the corn from the separate storage towers could be immediately mixed and packaged without any further treatment.

In the foregoing operation, best results were obtained when the dyed corn after rinsing and draining was merely dried in the mechanical dryer to a moisture content of about 22–24 percent. By rapidly recycling this corn within a vat, and by heating the corn to the temperature of about 80–90° F. while contacting the corn during its movement with the heated air of about 80–90° F., it was found that a uniform drying of the interior of the kernel was brought about and the kernels were brought to the desired final moisture content of about 14 percent.

In the foregoing process, it is important that the initial dye solution be kept at a temperature of around 160–170° F. for application of the dye to the kernels. By following the dyeing step and the surface drying step with the recycling of the corn through a tower where it meets an upwardly-flowing large volume of heated air, the corn is placed in condition for packaging within a period of around 22–23 hours or less.

While in the foregoing specification I have set out specific procedure in considerable detail for the purpose of illustrating embodiments of the invention, it will be understood that such details may be varied widely by those skilled in the art without departing from the spirit of my invention.

What is claimed is:

1. A process for dyeing unpopped popcorn kernels without aging the dyed kernels, comprising the steps of heating a dye solution to a temperature of about 160–170° F., immersing said kernels in said solution for a period of time sufficient to apply a uniform coating to the kernels, rinsing the surface dye from said kernels, drying the exterior surfaces of said kernels to an internal moisture content of about 22–24 percent and subsequently heating said kernels to a temperature of about 80–90° F. while recycling said kernels in countercurrent flow to heated air passing upwardly about said kernels to reduce the moisture content thereof to about 10–15 percent.

2. The process of claim 1 in which said kernels are surface dried to an internal moisture content of about 22–24 percent and then subjected to countercurrent heating contact with air having a temperature of about 80–90° F.

3. A process for dyeing unpopped popcorn kernels without aging the dyed kernels, comprising the steps of heating a dye solution to a temperature of about 160–170° F., immersing the kernels in said solution for about five minutes, drying the external surfaces of said kernels while maintaining an internal moisture content therein of about 22–24 percent, and then heating the kernels to about 90° F. while recycling the kernels in countercurrent flow to air heated to about 90° F. to reduce the moisture content thereof to about 10–15 percent.

References Cited
UNITED STATES PATENTS 2,663,645 12/1953 Park ------------------ 99—81
3,038,807 6/1962 Cathcart et al. -------- 99—83

RAYMOND N. JONES, Primary Examiner

U.S. Cl. X.R.

99—148